United States Patent [19]

Coker, Jr.

[11] 3,852,809

[45] Dec. 3, 1974

[54] RETURN TO ZERO DETECTION CIRCUIT FOR VARIABLE DATA RATE SCANNING

[75] Inventor: Charles Walter Coker, Jr., Los Gatos, Calif.

[73] Assignee: International Business Machines Corporation, Armonk, N.Y.

[22] Filed: July 5, 1973

[21] Appl. No.: 376,620

[52] U.S. Cl. .................... 360/40
[51] Int. Cl. .................... G11b 5/02
[58] Field of Search .......... 340/174.1 B, 174.1 A, 340/174.1 H; 360/40

[56] References Cited

UNITED STATES PATENTS

| | | | |
|---|---|---|---|
| 2,700,149 | 1/1955 | Stone, Jr. | 340/174.1 H |
| 2,834,883 | 5/1958 | Lukoff | 340/174.1 H |
| 2,864,077 | 12/1958 | De Turk | 340/174.1 H |
| 2,961,642 | 11/1960 | Lamb | 340/174.1 H |
| 3,402,402 | 9/1968 | Dorrell, Jr. | 340/174.1 H |
| 3,577,192 | 5/1971 | Schlaepfer | 340/174.1 H |
| 3,626,160 | 1/1971 | Hagopian | 340/174.1 H |
| 3,720,927 | 3/1973 | Wolf | 340/174.1 H |
| 3,725,646 | 4/1973 | Smead | 340/174.1 H |

*Primary Examiner*—Vincent P. Canney
*Attorney, Agent, or Firm*—Fraser and Bogucki

[57] ABSTRACT

This self-clocking detection circuit for a return to zero magnetic recording system detects the leading and trailing edges of recorded data bits and generates output signals indicative of a recorded character during an asynchronous time interval dependent upon the reading of successive leading and trailing edges and is substantially insensitive to recording density and scanning velocity. In one arrangement the electric read signal, which contains a first polarity initial pulse while reading the leading edge of a recorded character and an opposite polarity subsequent pulse while reading the trailing edge of a recorded character, is integrated to provide a signal which increases in magnitude in response to an initial pulse and decreases in magnitude in response to a subsequent pulse. An amplitude detector determines the polarity of the integrated signal and provides an indication of the recorded character when the magnitude exceeds a selected threshold. Alternatively, an amplitude detector senses initial and subsequent pulses and a digital logic circuit responsive thereto generates first and second output signals indicative of sensed characters during time intervals between initial and subsequent pulses.

10 Claims, 5 Drawing Figures

PATENTED DEC 3 1974

3,852,809

PATENTED DEC 3 1974 3,852,809

SHEET 3 OF 3

RETURN TO ZERO DETECTION CIRCUIT FOR VARIABLE DATA RATE SCANNING

BACKGROUND OF THE INVENTION

1. Field of the Invention

The invention relates to return to zero digital magnetic recording systems, and more particularly to a data rate insensitive self-clocking detection system which responds to the detection of leading and trailing edges of recorded pulses.

2. History of the Prior Art

Many digital magnetic recording techniques are presently known. These techniques include return to zero (RZ), non-return to zero (NRZ), NRZI and phase modulation recording techniques. However, these recording techniques require a synchronous clock signal during readback and are therefore unsatisfactory for magnetic slot readers, magnetic hand held scanners and inexpensive cassette tape recorders where variations in recording density or translational velocity cause large variations in the data rate which prevent the synchronization of a clock signal.

When return to zero modulation is employed, spaced apart positive and negative squarewave write pulses cause an unbiased recording medium to be polarized in one of two directions as a write pulse is received by a write head during the course of translational motion with respect to the recording medium. The resulting recording is a series of magnetized "spots" with the direction of magnetization depending upon the character bit which is stored.

As a read head is moved over a recorded "spot" during readback a pair of rapid opposite polarity pulses is induced in the read head output signal as the read head passes over the selectively magnetized "spot." As the leading edge of the "spot" is encountered the magnetic flux changes in one direction causing a first polarity initial output pulse and as the trailing edge of the "spot" is encountered the magnetic flux changes in the opposite direction causing an opposite polarity subsequent output pulse.

A conventional return to zero recording circuit differentiates the read head output signal to obtain a substantial pulse at the transition between the initial pulse and rapid transition to the opposite polarity subsequent pulse. The polarity of the pulse on the differentiated signal indicates which character was stored and a synchronized clock signal is utilized to provide a detection window to prevent the erroneous reading of noise signals when the read head is between "spots."

SUMMARY OF THE INVENTION

A self-clocking, data rate insensitive, return to zero magnetic recording system in accordance with the invention includes a detecting circuit which generates a binary output signal in response to initial and subsequent electric pulses from the read head. When reading a magnetic "spot" or data bit in a return to zero format a read head outputs a pair of opposite polarity pulses with the relative polarities being dependent upon the data character which is read. The detection circuit responds by generating a binary output signal as the initial pulse is encountered at the leading edge of a magnetic "spot" and terminating the output signal as the subsequent pulse is encountered at the trailing edge of a magnetic "spot."

One easily implemented arrangement requiring minimal circuitry includes an integrator responsive to the electric output signal from the read head and an amplitude detection circuit having a pair of amplitude detectors for positive and negative pulses. As an initial pulse is received by the integrating circuit the integrated output begins to increase in magnitude. As the magnitude increases beyond a selected threshold an amplitude detector turns on and generates an output signal. The opposite polarity subsequent pulse causes the integrated signal to decrease in magnitude and the output signal is terminated as the magnitude drops below a selected threshold. The particular nature of the binary output signal depends upon which amplitude detector is turned on and hence upon the polarity of the initial pulse.

Alternatively the detection circuit includes an amplitude detector circuit having a pair of amplitude detectors responsive to positive and negative excursions respectively of the read head electric signal. A demodulator logical circuit responds to signals from the amplitude detectors by generating a binary output signal in response to an initial amplitude detector signal and terminating the binary output signal in response to a subsequent amplitude detector output signal. The particular nature of the binary output signal depends upon which amplitude detector initially generates an output signal.

BRIEF DESCRIPTION OF THE DRAWINGS

The foregoing and other objects, features and advantages of the invention will be apparent from the following more particular description of the preferred embodiments of the invention, as illustrated in the accompanying drawing.

DETAILED DESCRIPTION

A detection circuit for a self-clocking, variable data rate web member information storage system in accordance with the invention is advantageously used in a variety of applications. These applications include slot devices wherein a storage medium such as a magnetic card or short strip of magnetic tape is inserted through a guide slot, hand held magnetic and optical scanners, inexpensive tape transports and other applications where the data record translation rate may vary over a wide range.

Figure 1:
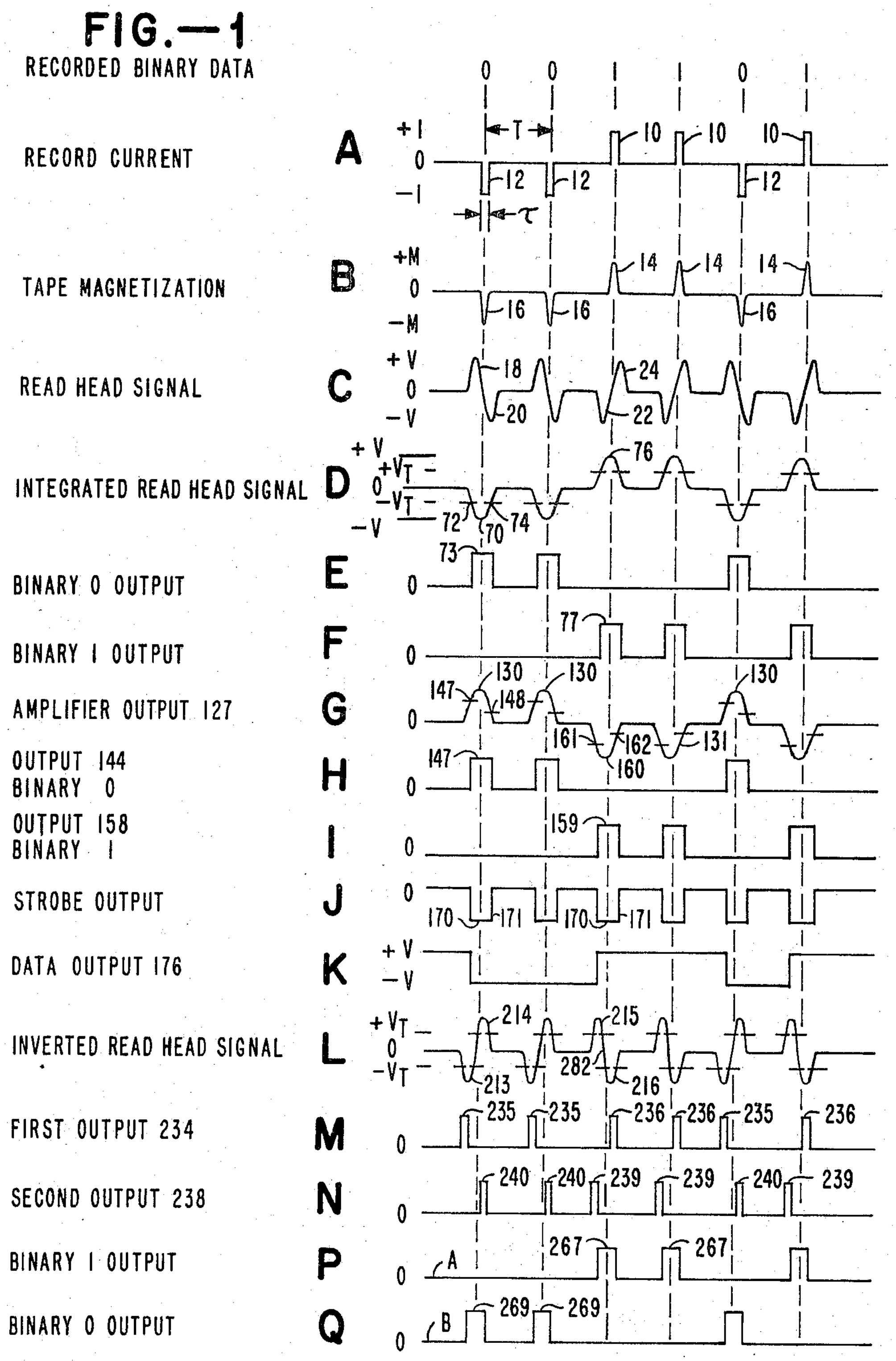
FIG. 1 is a graphical representation of several signal waveforms occurring at various points in detection circuits in accordance with the invention.

A read head output signal waveform suitable for demodulation by a detection circuit in accordance with the invention is illustrated in FIG. 1. As shown by curve A "ones" and "zeros" are written on a recording medium such as pre-erased magnetic tape by driving a write head with positive and negative squarewave current pulses 10, 12 respectively. The current pulses 10, 12 have a duration $\tau$ much less than the period T from the beginning of a pulse to the beginning of a subsequent pulse. The write head (not shown) responds to the pulses 10, 12 as shown in curve B by creating magnetic "spots" 14, 16, respectively, of oppositely polarized magnetization on nonpolarized magnetic tape.

As shown in curve C the read head has the approximate effect of differentiating the pattern stored in the magnetic tape. As the read head approaches the leading edge of a magnetic "spot" an initial electric pulse signal is generated and as the read head approaches the trailing edge of a magnetic "spot" an opposite polarity subsequent electric pulse signal is generated. When a stored bit is a zero 16, the resulting read head output signal has a positive initial pulse 18 and a negative subsequent pulse 20. Similarly, when a stored bit is a one 14, the resulting read head output signal has a negative initial pulse 22 and a positive subsequent pulse 24. Thus, the relative polarities of the read head output pulses indicate what data character is being read.

Figure 2:
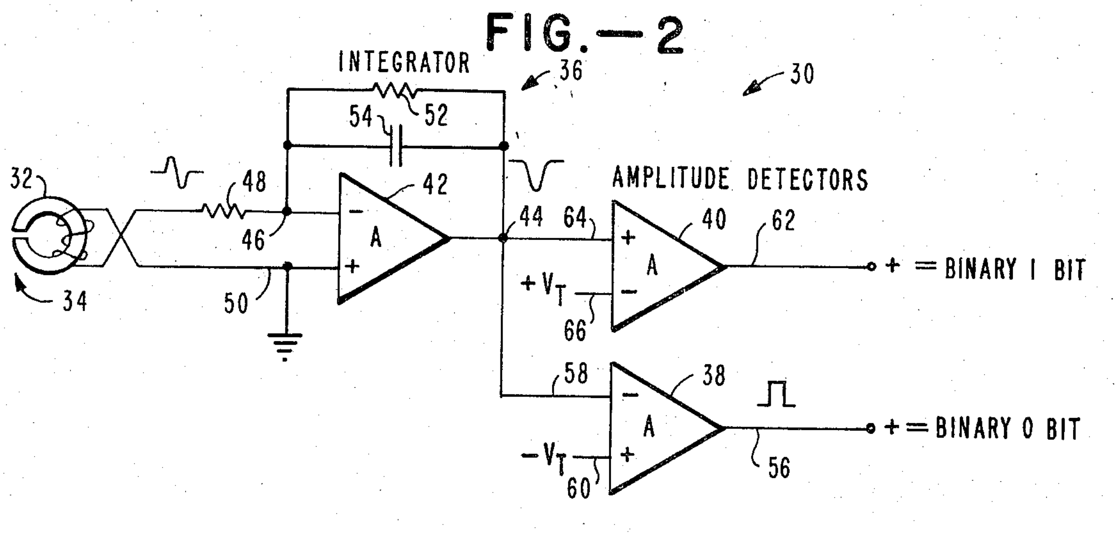
FIG. 2 is a schematic diagram representation of an integrating type of detection circuit in accordance with the invention.

An integrator type detection circuit 30 in accordance with the invention is shown in FIG. 2. The detector circuit 30 combines extreme simplicity with adequate accuracy and does not require synchronous, constant data rate operation. The read head is schematically illustrated as in inductively coupled magnetic core 32 having a gap 34 which is translationally moved in close proximity to a magnetic medium storing data in a return to zero configuration. However, the read head may in general be of any suitable type such as a transverse biased magnetoresistive flux sensing head, a photo sensing head or any other head capable of reading information stored in a return to zero format.

The detection circuit 30 further includes an integrator 36, an operational amplifier 38 connected as a first amplitude detector and an operational amplifier 40 connected as a second amplitude detector. The integrator 36 includes an operational amplifier 42 having an output 44, negative input 46 coupled through a gain determining resistor 48 to a first terminal of the read head and a positive input 50 connected to both a second terminal of the read head and ground. A resistor 52 and a capacitor 54 are connected in parallel between the output 44 and negative input 46 to provide integrating feedback impedance.

The amplitude detecting operational amplifier 38 has an output 56 generating a positive squarewave pulse to indicate a first type of binary output when a zero is read. A negative input 58 is connected to output terminal 44 and a positive input 60 is connected to a negative threshold reference voltage $-V_T$. Similarly, the amplitude detecting operational amplifier 40 has an output 62 generating a positive squarewave pulse to indicate a second type of binary output when a one is read. A positive input 64 is connected to output 44 and a negative input 66 is connected to a positive threshold voltage $+V_T$ of selected magnitude.

The integrator 36 amplifies and inverts the read head electric output signal to generate an integrated read head signal at output terminal 44 similar to curve D in FIG. 1 to which reference is now made. As initial pulse 18 is encountered an integrated signal pulse 70 begins increasing in magnitude with negative polarity until a subsequent pulse 20 causes the magnitude of pulse 70 to decrease back to zero. As the magnitude of pulse 70 reaches the threshold value $-V_T$ at point 72 amplitude detector 38 is turned on causing it to generate a positive output signal represented by pulse 73 in curve E of FIG. 1 which is indicative of a zero binary bit and as the subsequent pulse 20 causes pulse 70 to decrease in magnitude to less than $-V_T$ at point 74 the output pulse signal 73 is terminated. In a similar manner, the reading of a binary one generates a positive pulse 76 on the integrated output and amplitude detector 40 provides a positive output pulse signal 77 shown in curve F of FIG. 1 which is indicative of a one binary bit during the time period that the magnitude of pulse 76 exceeds $+V_T$.

Figure 3:
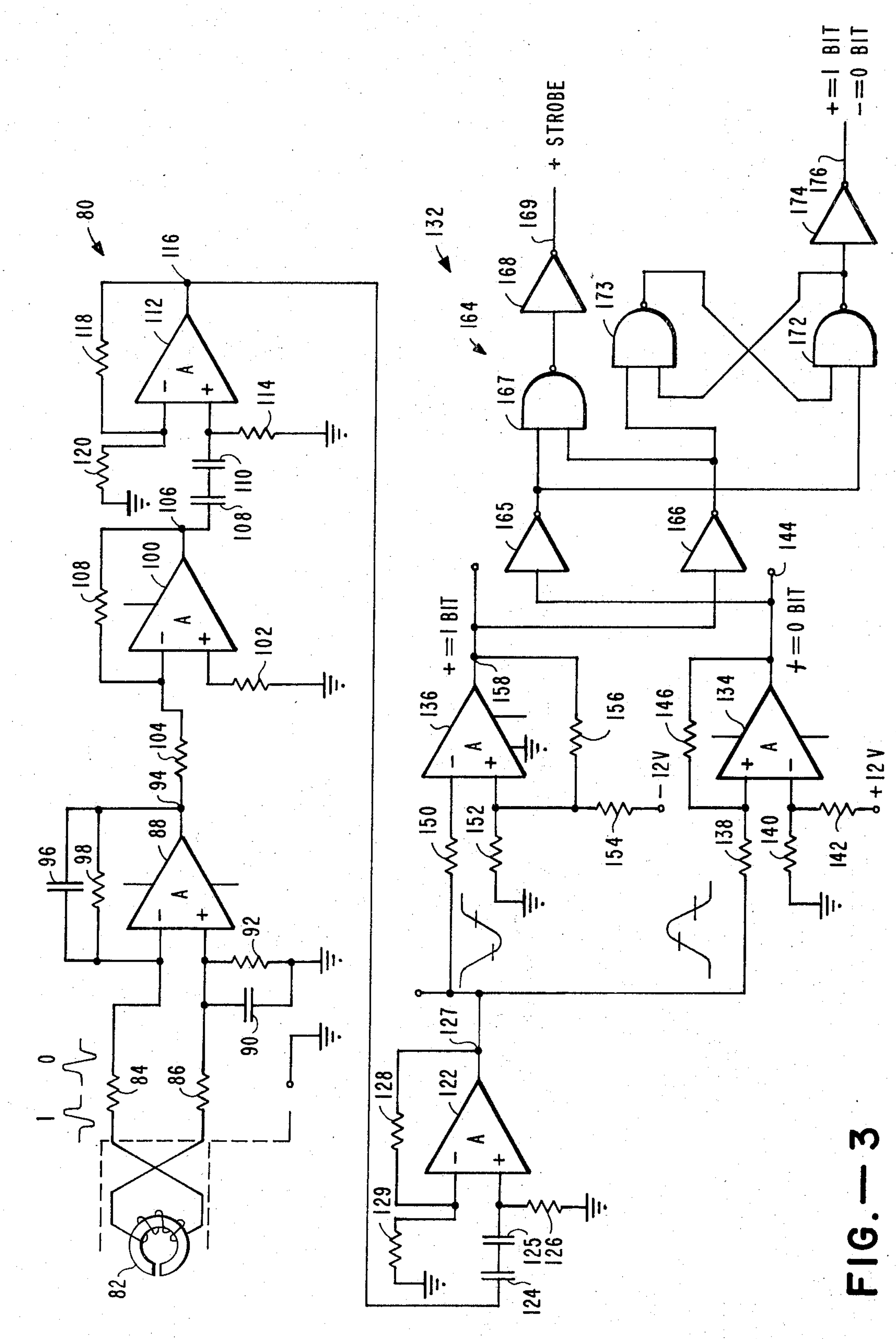
FIG. 3 is a schematic diagram representation of an alternative embodiment of an integrating type of detection circuit in accordance with the invention which is suitable for use in a magnetic slot scanner read circuit.

A detection circuit 80 of the integrator type which is particularly adapted for use as a magnetic slot scanner detection circuit is shown in FIG. 3. A read head which is schematically represented as a core 82 has two output terminals connected through two 5.2 K resistors 84, 86 to the negative and positive input terminals, respectively of an operational amplifier 88 which is connected in an integrating configuration. The positive input of operational amplifier 88 is also connected through the parallel combination of a 0.1 $\mu f$ capacitor 90 and a 49.9 K resistor 92 to ground while an output 94 is connected through the parallel combination of a 0.1 $\mu f$ capacitor 96 and a 49.9 K resistor 98 to the negative input terminal. Following the integrating amplifier in cascade is an operational amplifier 100 connected as an inverting amplifier with a positive input terminal connected through a 1 K resistor 102 to ground, a negative input terminal connected through a 1 K resistor 104 to output 94 and an output terminal 106 connected through a 20 K resistor 108 to the negative input terminal.

The output terminal 106 is connected in cascade fashion through a pair of series connected 6.8 $\mu f$ electrolytic capacitors 108 and 110 having their negative terminals connected in common to the positive input of an operational amplifier 112 which is connected to form a noninverting amplifier. Amplifier 112 also has its positive input terminal connected through a 10 K resistor 114 to ground, an output terminal 116 connected through a 20 K resistor 118 to a negative input terminal which also connects through a 1 K resistor 120 to ground. Output 116 is connected in cascade fashion to a second non-inverting amplifier having an operational amplifier 122. The output 116 is connected through a pair of series connected 6.8 $\mu f$ electrolytic capacitors 124 and 125 having their negative terminals connected in common to a positive input of amplifier 122. The positive input also connects through a 10 K resistor 126 to ground. An output 127 of amplifier 122 is connected through a 5.1 K feedback resistor 128 to a negative input and the negative input also connects through a 1 K resistor 129 to ground. As illustrated in curve G of FIG. 1, positive pulses 130 are generated at output 127 of amplifier 122 in response to the reading of zero bits and negative pulses 160 are generated in response to the reading of 1 bit.

An amplitude detector circuit 132 having operational amplifiers 134 and 136 is coupled to the output 127. Amplifier 134 has a positive input terminal coupled through a 5.1 K resistor 138 to output 127, a negative terminal coupled through a 1.6 K resistor 140 to ground and through an 8.2 K resistor 142 to +12 V voltage source. Amplifier 134 also has an output 144 coupled through a 100 K resistor 146 to its positive input terminal. Amplifier 134 responds to a positive pulse 130 at output 127 of the preceding amplifier stage by generating a positive pulse 147 as shown in curve H of FIG. 1 to indicate the reading of a binary zero. Because of the slightly regenerative positive feedback provided by resistor 146, the output 144 initially goes positive only when the output 127 of amplifier 122 reaches a threshold voltage of +2.1 volts at point 147 of curve G, but then remains positive until the output 127 drops below approximately +1.9 volts at point 148.

Amplifier 136 is connected to detect negative going pulses at output 127. An input terminal of amplifier 136 is connected through a 5.1 K resistor 150 to output 127 and a positive input terminal is connected through a 10 K resistor 152 to ground, through a 51 K resistor 154 to a −12 volt source and through a 100 K resistor 156 to an output 158 of amplifier 156. As shown in curve I of FIG. 1 output 158 generates a positive pulse 159 in response to a negative pulse 160 at output 127, thereby indicating the reading of a 1 bit. As a result of a slightly regenerative positive feedback provided by resistor 156, the output 158 initially goes positive when output 127 is negative and exceeds a threshold of −1.8 volts at point 161 and then remains positive until the magnitude of output 127 becomes less than a second threshold of approximately −1.6 volts as indicated at point 162. Thus, output 144 produces a positive, short duration squarewave pulse 147 in response to the reading of a zero and output 158 produces a positive, short duration squarewave pulse 159 in response to the reading of a one.

An output logical circuit 164 which is connected to the outputs 144 and 158, latches an indicated output and then generates a strobe pulse for transferring the latched output to an associated data processing system (not shown). Logical circuit 164 includes an inverting amplifier 165 connected to output 144 and an inverting amplifier 166 connected to output 158. A two input NAND gate 167 has its inputs connected to the outputs of amplifiers 165 and 166 and generates a positive pulse at the output thereof in response to a positive pulse at either output 144 or output 158, indicating the reading of a zero or one respectively. An inverting amplifier 168 having an output 169 inverts the output of NAND gate 167 as shown in curve I of FIG. 1 to provide a negative pulse 170 having a positive going trigger edge 171 as an output strobe signal at the trailing edge of a pulse on output 144 and 158. Strobing at the trailing edge of an amplitude detector pulse insures that the output is latched prior to the generation of the strobe signal 171. A latch includes first and second two input NAND gates 172 and 173. NAND gate 172 has one input connected to the output of amplifier 165 and the other input connected to the output of NAND gate 173. NAND gate 173 has one input connected to the output of amplifier 166 and the other input connected to the output of NAND gate 172. An inverting amplifier 174 having an output 176 is connected to the output of NAND gate 172 and as illustrated by curve K of FIG. 1, provides a latched positive voltage in response to the reading of a 1 bit and a latched negative voltage in response to the reading of a zero bit. These latched voltages represent the data output at the time of the strobe signal 171.

Figure 4:
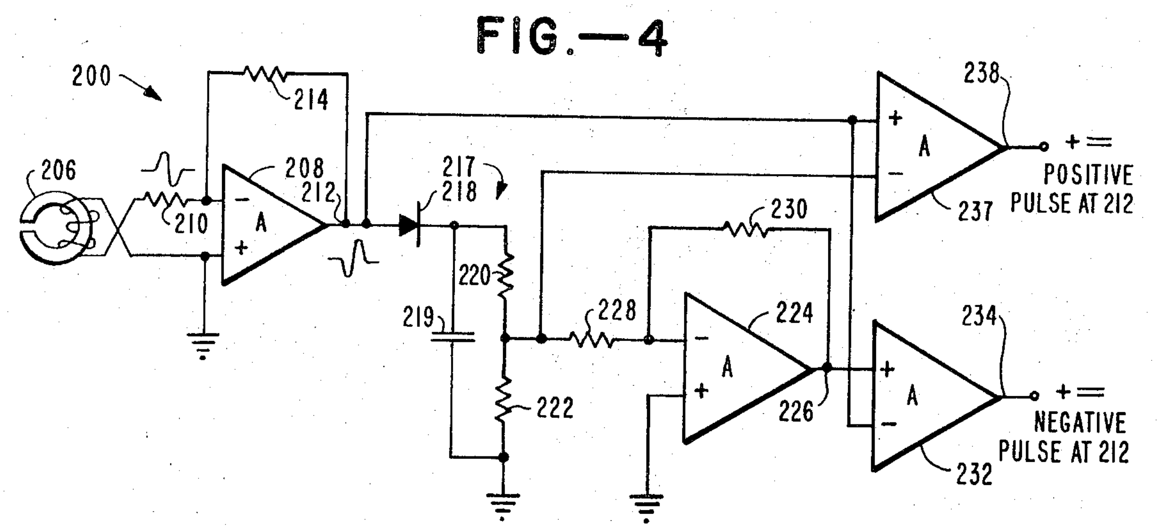
FIG. 4 is a schematic diagram representation of an amplitude detector portion of a nonintegrating type of circuit in accordance with the invention.
Figure 5:
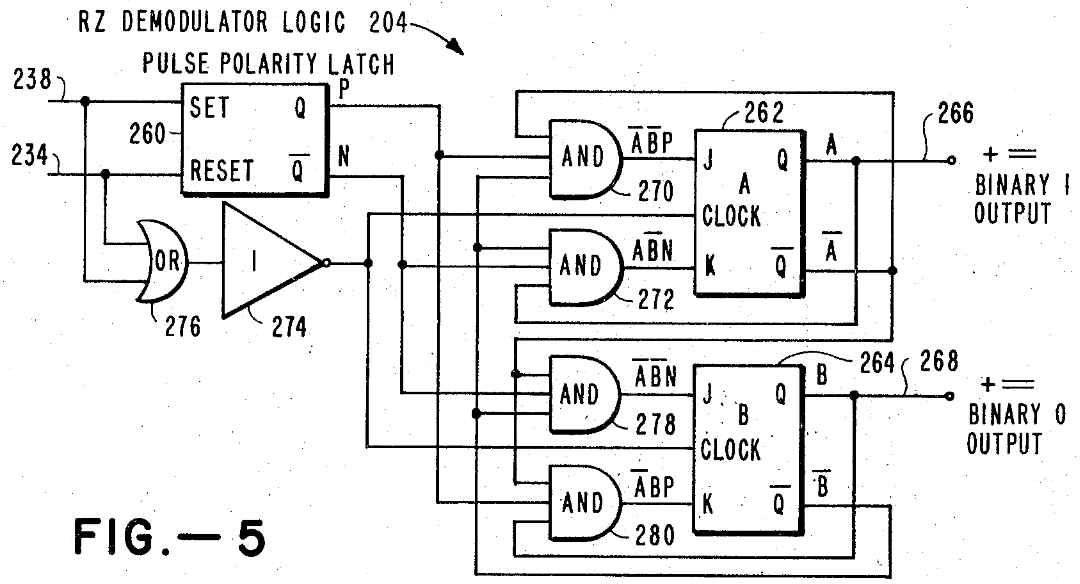
FIG. 5 is a schematic diagram representation of demodulator logical circuit portion of a nonintegrating type of detection circuit in accordance with the invention.

A nonintegrating amplitude detector type of detection circuit which is suitable for variable data rate RZ recording includes an amplitude detector circuit 200 shown in FIG. 4 and a demodulator logic circuit 204 shown in FIG. 5. The amplitude detector circuit 200 includes a read head schematically represented as an inductively coupled core 206. An operational amplifier 208 which is connected in an inverting amplifier configuration has a grounded positive input terminal connected to one output of read head 206 and a negative input terminal connected through a resistor 210 to the other output of read head 206. An output 212 of amplifier 208 is connected through a feedback resistor 214 to the negative input. The output from read head 206, which is graphically represented by curve C of FIG. 1, is amplified and inverted by amplifier 208 to generate the signal waveform represented by curve L of FIG. 1. The output 212 of amplifier 208 produces a negative initial pulse 213 followed by a positive subsequent pulse 214 in response to the reading of a zero and a positive initial pulse 215 followed by a negative subsequent pulse 216 in response to the reading of a one.

A threshold circuit is responsive to the signal at output 212 and includes a peak detector 217 having a diode 218 with its anode connected to output 212, a capacitor 219 connected between the cathode of diode 218 and ground and a pair of series connected resistors 220 and 222 connected in parallel with capacitor 219. The threshold setting circuit also includes an operational amplifier 224 having an output 226, a positive input connected to ground, a negative input connected through a resistor 228 to a point intermediate series connected resistors 220 and 222 and a feedback resistor 230 connected between output 226 and the negative input. In this particular arrangement, resistors 228 and 230 are equal in value, thereby causing amplifier 224 to have a gain of one.

The use of a threshold setting circuit which provides a threshold output dependent upon the magnitude of the amplified pulses generated at output 212 is necessitated by the large magnitude variations in the information signal. Because read head 206 acts as a differentiator as it reads stored information, the magnitudes of both the noise and information signal peaks increase in proportion to the translational velocity of the read head 206 with respect to the storage medium. If the threshold were to be fixed at a relatively low magnitude for detection of output signals at a slow translational velocity, noise might be wrongfully interpreted as an information signal when scanning at a higher velocity. Similarly, use of a relatively large magnitude threshold might cause a failure to detect data information during a low speed scan. The combination of diode 16 and capacitor 18 cause peak positive voltages at output 212 to be communicated to the capacitor 18 and stored therein. Voltage divider resistors 220 and 222 permit a selected proportion of the peak voltage which appears at the cathode of diode 216 to be utilized as the threshold magnitude. For instance, if resistors 220 and 222 are equal in magnitude, a threshold voltage will vary with the positive peaks of the information signal and will be approximately 50 percent thereof. Amplifier 224 inverts the threshold voltage $-V_T$ at the point intermediate the two resistors 220 and 222 to provide a negative reference voltage $-V_T$.

An operational amplifier 232 is connected as a first amplitude detector and has an output 234, a negative input connected to receive the read signal at output 212 and a positive input connected to the $-V_T$ signal at output 226. As illustrated by curve M in FIG. 1, short duration, positive squarewave pulses 235, 236 are generated as respectively initial and subsequent first amplitude detector output signals at output 234 whenever the signal at output 212 is negative and exceeds $-V_T$ in magnitude. Similarly, a second amplitude detector includes amplifier 237 having an output 238, a negative input connected to a threshold signal $+V_T$ intermediate resistors 220 and 222 and a positive input connected to receive the amplified read signal at output 212. As illustrated by curve N in FIG. 1, a second amplitude detector output signal having short duration, positive squarewave pulses 239, 240 is generated at the output 238 of amplifier 237 whenever an amplified read pulse is positive and has a magnitude in excess of $+V_T$. It will be observed from curves M and N in FIG. 1 that outputs 234 and 238 provide sequential, initial and subsequent positive squarewave pulses in response to initial and subsequent pulses of the amplified read signal as shown in curve L. For instance, the reading of a zero causes the generation of an initial pulse 235 on first output 234 followed by a subsequent pulse 240 on second output 238. Similarly, the reading of a one causes the generation of an initial pulse 239 on second output 238 followed by a subsequent pulse 236 on first output 234.

Referring now to FIG. 5, the demodulator logic circuit 204 includes a set-reset flip-flop 260 having a set input connected to amplitude detector output 238, a reset input connected to amplitude detector output 234 and outputs Q, $\bar{Q}$ which are positive when in the set and reset states, respectively. A pair of J-K flip-flops including an A flip-flop 262 and a B flip-flop 264 are connected to provide the demodulated binary outputs of the detector circuit. A Q output 266 of flip-flop 262 carries a signal designated "A" which is illustrated as curve P in FIG. 1 and has a short duration, positive squarewave pulse 267 whenever a binary one is read from the record medium. Similarly, a Q output 268 of flip-flop 264 carries a signal designated "B" which is illustrated as curve Q in FIG. 1 and has a short duration, positive squarewave pulse 269 whenever a binary zero is read from the record medium.

The J input to flip-flop 262 is connected to a three input AND gate 270 having its three inputs connected to the $\bar{Q}$ output of flip-flop 262, the Q output of flip-flop 260 which carries a logical signal P when positive and the $\bar{Q}$ output of flip-flop 264. The J input to flip-flop 262 thus carries the logical signal $\bar{A}\,\bar{B}\,P$ and causes flip-flop 262 to become set in response to this $\bar{A}\,\bar{B}\,P$ logical signal whenever both flip-flop 262 and flip-flop 264 are previously reset and an initial pulse 239 indicating the reading of a one is received at second detector output 238. The K input to flip-flop 262 is connected to a three input AND gate 272 having its three inputs connected to the $\bar{Q}$ output of flip-flop 264, the $\bar{Q}$ output of flip-flop 260 which carries a logical signal N when positive and the Q output of flip-flop of 262. Flip-flop 262 is thus reset in response to a logical signal $A\bar{B}N$ which occurs when a subsequent pulse signal 236 indicating the completion of the reading of a binary one is received from first detector output 234. This subsequent signal terminates the positive pulse 267 at output 266.

Both flip-flops 262 and 264 are clocked by a positive going transition at a clock input which is connected through an inverting amplifier 274 to a two input OR gate 276 having its inputs connected to first and second amplitude detector outputs 234 and 238. The clock input thus has its positive going clocking transition at the trailing edge of a pulse input from the amplitude detector circuit, thereby allowing the logical circuitry sufficient time to settle to a final state before the flip-flop 262 and 264 are clocked.

The flip flop 264 has its J input connected to a three input AND gate 278 having its inputs connected to the $\bar{Q}$ output of flip-flop 262, the $\bar{Q}$ output of flip-flop 260 and the $\bar{Q}$ output of flip-flop 264. Flip-flop 264 is thus set by the logical signal $\bar{A}\,\bar{B}\,N$, which occurs whenever both flip-flops are previously reset and an initial pulse 235 is generated at amplitude detector output 234 in response to the reading of binary zero from the storage medium. The K input to flip-flop 264 is connected to the output of a three input AND gate 280 having its inputs connected to the $\bar{Q}$ output of flip-flop 262, the Q output of flip-flop 260 and the Q output of flip-flop 264. Flip-flop 264 is thus reset in response to the logical signal $\bar{A}BP$ which means that while flip-flop 264 is in the set state and generating a pulse 269, a subsequent pulse 240 is generated at amplitude detector output 238.

The integrating type of detector circuit shown in FIGS. 2 and 3 is inherently self-synchronizing. Regardless of where reading begins on a storage record, the output will very rapidly begin to indicate the proper information content of the record. The peak detector type of detection circuit shown in FIGS. 4 and 5, on the other hand, is not necessarily self-synchronizing. If reading begins within a data "spot" on the storage record, an improper information content may be indicated at the outputs 266 and 268 of demodulator logical circuit 204 in FIG. 5. For instance, if reading begins at point 282 in curve L of FIG. 1, the negative going subsequent pulse 216 will be interpreted by the detection circuit as an initial pulse causing a zero output signal 269 to be erroneously generated on output 268. However, synchronization can be easily achieved by insuring that the reading of data always begins at a region of the recording medium in which no information is stored or by beginning each data block with either an alternate one and zero or zero and one. The use of alternate successive data characters causes automatic synchronization because the subsequent pulse of the first character will always be of the same polarity as the initial pulse of the second character, causing the initial pulse of the second character to be ignored if the detection circuit is out of synchronization. The subsequent pulse of the second character will thus automatically bring the detection circuit back into synchronization.

While the invention has been particularly shown and described with reference to preferred embodiments thereof, it will be understood by those skilled in the art that the foregoing and other changes in form and details may be made therein without departing from the spirit and scope of the invention.

What is claimed is:

1. For use in a digital recording system wherein binary bits of information are stored in a return to zero format by a storage medium and wherein translational motion between a read head and the storage medium causes the read head to generate successive initial and subsequent distinguishable electric signals having a relative nature dependent upon the information content of a binary bit being read, a self-clocking information detection circuit connected to receive the electric signals from the read head, the detection circuit comprising an integrator connected to receive a read head electric signal and generate an integrated read head electric signal as an output; first and second detectors connected to detect positive and negative pulses respectively on the integrated read head electric signal, each detector including circuitry for initiating a predetermined detector output signal when a pulse of a polarity to which the detector is responsive exceeds a first predetermined magnitude and terminating a detector output pulse only when the pulse magniude is less than a second predetermined magnitude which is less than the first predetermined magnitude.

2. For use in a digital magnetic recording system wherein binary bits of information are stored in a return to zero format in which magnetization of a magnetic medium with a first polarity represents a first binary character and magnetization of a magnetic medium with a second polarity represents a second binary character and wherein a read head generates initial and subsequent successive electric pulses of opposite polarity in response to the reading of a bit stored on the magnetic medium with the relative polarity of the successive pulses being dependent upon the polarity of magnetization of a bit which is read, a self-clocking information detection circuit connected to receive the electric pulses from the read head, the detection circuit comprising an integrator connected to receive an electric read head pulse as an input and generate the time integral of the read head pulse as an integrated output signal; a peak detector circuit connected to detect peak magnitudes of the integrated output signal and generate a reference signal having a magnitude proportional thereto; and a detector circuit connected to the reference signal and the integrated output signal, the detector circuit generating a first detector output signal whenever the integrated output signal is of a first polarity and has a magnitude greater than the magnitude of the reference signal and generating a second detector output signal whenever the integrated output signal is of a second polarity opposite the first polarity and has a magnitude greater than the magnitude of the reference signal.

3. For use in a digital magnetic recording system wherein binary bits of information are stored in a return to zero format in which magnetization of a magnetic medium with a first polarity represents a first binary character and magnetization of a magnetic medium with a second polarity represents a second binary character and wherein a read head generates initial and subsequent successive electric pulses of opposite polarity in response to the reading of a bit stored on the magnetic medium with the relative polarity of the successive pulses being dependent upon the polarity of magnetization of a bit which is read, a self-clocking information detection circuit connected to receive the electric pulses from the read head, the detection circuit comprising an integrator connected to receive the electric pulses and generate an integrated read signal indicative of the integral of the electric pulses, and at least one amplitude detector connected to the integrator and generating an output signal when the integrated read signal has a selected polarity and exceeds a selected magnitude, the magnitude of the integrated read signal increasing beyond the selected magnitude in response to an initial electric pulse and decreasing below the selected magnitude in response to a subsequent electric pulse.

4. For use in a digital magnetic recording system wherein binary bits of information are stored in a return to zero format in which magnetization of a magnetic medium with a first polarity represents a first binary character and magnetization of a magnetic medium with a second polarity represents a second binary character and wherein a read head generates initial and subsequent successive electric pulses of opposite polarity in response to the reading of a bit stored on the magnetic medium with the relative polarity of the successive pulses being dependent upon the polarity of magnetization of a bit which is read, a self-clocking information detection circuit connected to receive the electric pulses from the read head, the detection circuit comprising an amplitude detector connected to receive the electric pulses and generate first and second output signals in response to respective first and second opposite polarity electric pulses exceeding first and second selected magnitudes respectively; and a demodulator logical circuit connected to receive the first and second output signals, the demodulator circuit generating a binary output signal in response to an amplitude detector output signal and terminating the output signal in response to a different amplitude detector output signal, the demodulator circuit output signal being of a first type when generated in response to a first amplitude detector output signal and of a second type when generated in response to a second amplitude detector output signal.

5. The detection circuit as set forth in claim 4 above wherein the demodulator circuit includes first and second flip-flops having set, reset outputs A, $\bar{A}$ and B, $\bar{B}$ respectively, wherein output A is the first type of demodulator circuit output signal and wherein output B is the second type of demodulator circuit output signal.

6. The detection circuit as set forth in claim 5 above wherein the first flip-flop is connected to be set in response to a first amplitude detector output signal when both the first and second flip-flops are in a reset condition, wherein the first flip-flop is connected to be reset in response to a second amplitude detector output signal when the first flip-lop is in a set condition, wherein the second flip-flop is connected to be set in response to a second amplitude detector output signal when both the first and second flip-flops are in a reset condition and wherein the second flip-flop is connected to be reset in response to a first amplitude detector output signal when the second flip-flop is in a set condition.

7. A self-clocking circuit for detecting bits of digital information stored on a magnetic medium in a return to zero format in which a first polarity of magnetization represents a first binary character and an opposite polarity of magnetization represents a second binary character comprising:

a read head positionable adjacent the magnetic medium providing an electric signal indicative of flux changes encountered during relative translational motion between the read head and the magnetic medium, said electric signal including first and second successive pulses of first and opposite polarities in response to leading and trailing edge, respectively of a stored bit with the polarity of the first pulse being dependent upon the polarity of magnetization of the storage medium at a character position being read; and a detection circuit connected to receive the electric signal, the detection circuit generating a first output signal in response to a first pulse of one polarity, generating a second output signal in response to a first pulse of a polarity opposite the one polarity, and discontinuing generating of the output signal in response to a second pulse.

8. A data detection circuit connected to receive an electric read signal from a read head of a digital magnetic recording system wherein the reading of a first character induces a positive initial pulse and a negative subsequent pulse on the read signal and the reading of a second character induces a negative initial pulse and a positive subsequent pulse on the read signal, the detection circuit comprising an amplitude detector connected to detect positive and negative excursions of the electric read signal beyond selected magnitudes chosen to permit detection of initial and subsequent pulses and generate first and second output signals in response to positive and negative excursions respectively; and a digital logic demodulator circuit connected to generate first and second detector circuit output signals indicative of information read by the read head, the first detection circuit output signal being intitiated by an initial amplitude detector output signal when there is no detection circuit output signal and terminated by a subsequent second amplitude detector output signal and the second detection circuit output signal being initiated by a second amplitude detector output signal when there is no detection circuit output signal and terminated by a subsequent first amplitude detector output signal.

9. The information detection circuit as set forth in claim 1 above, wherein the first detector comprises a high gain differential amplifier having a positive input, a negative input coupled to a reference voltage of the first predetermined magnitude and an output; a first resistance coupling the positive input to the read head integrated electric signal; and a second resistance coupling the output of the differential amplifier to the positive input thereof.

10. The detection circuit as set forth in claim 2 above, further comprising a digital logic circuit including a first asynchronous flip-flop having a set input coupled to the first detector output signal, a reset input connected to the second detector output signal, a set condition output signal P and a reset condition output signal N; a clocking circuit connected to generate a clocking signal at each termination of a first detector output signal and at each termination of a second detector output signal; second and third J-K flip-flops, each connected to assume a new state dependent upon the states of J and K inputs thereto at each occurrence of the clock signal, the second flip-flop having J, K inputs JA, KA respectively and set, reset outputs A, $\bar{A}$ respectively, the third flip-flop having J, K inputs JB, KB respectively and set, reset outputs, B, $\bar{B}$ respectively; and logic circuitry connected to drive the second and third flip-flop inputs in accordance with the logical functions $JA = \bar{A}\bar{B}P$, $KA = A\bar{B}N$, $JB = \bar{A}\bar{B}N$, and $KB=\bar{A}BP$.

* * * * *

PO-1050
(5/69)

UNITED STATES PATENT OFFICE
CERTIFICATE OF CORRECTION

Patent No. 3,852,809 Dated December 3, 1974

Inventor(s) Charles Walter Coker, Jr.

It is certified that error appears in the above-identified patent and that said Letters Patent are hereby corrected as shown below:

Column 10, line 50, "flip-lop" read --flip-flop--.
Column 11, line 1, "edge, respec-" read --edges respec- --.

Signed and sealed this 4th day of February 1975.

(SEAL)
Attest:

McCOY M. GIBSON JR.
Attesting Officer

C. MARSHALL DANN
Commissioner of Patents